US012215873B2

(12) United States Patent
Song et al.

(10) Patent No.: US 12,215,873 B2
(45) Date of Patent: Feb. 4, 2025

(54) ELECTRIC HEATER AND COOKING APPLIANCE HAVING SAME

(71) Applicant: LG ELECTRONICS INC., Seoul (KR)

(72) Inventors: Misun Song, Seoul (KR); Yooseok Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 17/874,097

(22) Filed: Jul. 26, 2022

(65) Prior Publication Data

US 2022/0357042 A1 Nov. 10, 2022

Related U.S. Application Data

(62) Division of application No. 16/546,679, filed on Aug. 21, 2019, now Pat. No. 11,435,088.

(30) Foreign Application Priority Data

Aug. 21, 2018 (KR) ........................ 10-2018-0097613

(51) Int. Cl.
*F24C 7/08* (2006.01)
*F24C 7/06* (2006.01)
*H05B 3/74* (2006.01)

(52) U.S. Cl.
CPC .............. *F24C 7/083* (2013.01); *F24C 7/067* (2013.01); *H05B 3/74* (2013.01); *H05B 3/748* (2013.01);

(Continued)

(58) Field of Classification Search
CPC .......... F24C 7/046; F24C 7/067; F24C 7/083; H05B 2206/022; H05B 2213/03;
(Continued)

(56) References Cited

U.S. PATENT DOCUMENTS 3,496,336 A 2/1970 Hingorany ............. H05B 3/748 219/466.1
5,177,341 A * 1/1993 Balderson .............. H05B 3/748 219/466.1

(Continued)

FOREIGN PATENT DOCUMENTS

CN 1703936 A 11/2005
DE 2524840 A1 8/1976

(Continued)

*Primary Examiner* — Sang Y Paik
(74) *Attorney, Agent, or Firm* — Bryan Cave Leighton Paisner LLP

(57) ABSTRACT

An electric heater includes a substrate; and a first plane heating element disposed on one surface of the substrate, in which the first plane heating element includes a first track; a second track spaced apart from the first track; and a third track spaced apart from the second track. At least a portion of the second track is located between the first track and the third track, and the first track and the second track are connected by a first bridge, where the first bridge includes a first outer protrusion protruding toward the third track. The third track is formed with a curved portion which protrudes in an outward direction, and the first outer protrusion faces an inside of the curved portion in the outward direction and is spaced apart from the curved portion.

12 Claims, 6 Drawing Sheets

(52) U.S. Cl.
CPC .. *H05B 2203/003* (2013.01); *H05B 2203/007* (2013.01)

(58) Field of Classification Search
CPC ... H05B 3/70; H05B 3/72; H05B 3/74; H05B 3/748; H05B 3/68; H05B 3/681–688; H05B 2203/007; H05B 2203/013
USPC .......................................................... 219/478
See application file for complete search history.

(56) References Cited

U.S. PATENT DOCUMENTS

| | | | | |
|---|---|---|---|---|
| 5,221,829 | A | 6/1993 | Yahav | H05B 3/68 219/448.11 |
| 5,270,519 | A | 12/1993 | Higgins | F24C 15/106 219/448.19 |
| 6,207,938 | B1 | 3/2001 | Taylor et al. | |
| 6,616,767 | B2 * | 9/2003 | Zhao | H01L 21/67103 392/416 |
| 9,894,716 | B2 | 2/2018 | Mohr | |
| 2003/0075537 | A1 * | 4/2003 | Okajima | H05B 3/68 219/468.1 |
| 2004/0108308 | A1 * | 6/2004 | Okajima | H01L 21/67109 219/468.1 |
| 2006/0096972 | A1 * | 5/2006 | Nakamura | H01L 21/67103 219/544 |
| 2009/0107983 | A1 | 4/2009 | Horsmann | H05B 3/688 219/520 |
| 2017/0086259 | A1 | 3/2017 | Du et al. | |
| 2017/0245323 | A1 | 8/2017 | Lee et al. | |

FOREIGN PATENT DOCUMENTS

| | | | |
|---|---|---|---|
| DE | 69719318 | T2 | 9/2003 |
| DE | 10 2013 216290 | A | 2/2015 |
| EP | 228808 | | 7/1987 |
| EP | 3211965 | A1 | 8/2017 |
| KR | 10-2009-0009600 | A | 1/2009 |
| KR | 10-2014-0019683 | A | 2/2014 |
| KR | 10-1609756 | B1 | 4/2016 |
| KR | 101762159 | | 7/2017 |
| WO | 96/17496 | A1 | 6/1996 |

* cited by examiner (a)

(b)

ELECTRIC HEATER AND COOKING APPLIANCE HAVING SAME

CROSS-REFERENCE TO RELATED APPLICATIONS

This application is a divisional of U.S. application Ser. No. 16/546,679, filed on Aug. 21, 2019, which claims the benefit of Korean Patent Application No. 10-2018-0097613, filed on Aug. 21, 2018, all of which are incorporated by reference in their entirety herein.

FIELD OF THE DISCLOSURE

The present disclosure relates to an electric heater applied to a cooking appliance, and to an electric heater having a plane heating element.

BACKGROUND

A heater is a device for heating purposes, and includes an electric heater using a Joule heat generated by flowing current through a resistance wire or the like, an electric heater generating heat by visible light or infrared rays, or the like.

The electric heater may be installed in a cooking appliance such as a cooktop for heating food or a container (hereinafter referred to as an object to be heated). In recent years, electric heaters using an plane heating element are gradually increasing.

As an example of such an electric heater, Korean Patent Registration No. 10-1762159 B1 (published on Aug. 4, 2017) discloses a plane heating element including a substrate including a surface made of an electrically insulating material, a heating element attached to the surface of the substrate and having a predetermined shape, and a power supply for supplying electricity to the heating element.

In the electric heater, the temperature distribution of an object to be heated may be changed according to the shape (that is, the pattern) of the plane heating element, and the plane heating element may be formed in a shape capable of heating the object to be heated as uniformly as possible.

The plane heating element of the electric heater includes a plurality of track portions which have a straight line shape or an arc shape, and adjacent track portions of the plurality of track portions may be shapes which are connected to a bridge portion (or a track portion).

As another example of the heater, European Patent Publication No. EP 0,228,808 A2 (published on Jul. 15, 1987) discloses a temperature sensitive device. Such a device is configured by printing a heater track made of a conductive material and a plurality of electrodes on a ceramic coating layer. As current is supplied through the electrodes, radiant heat is generated in the heater track.

SUMMARY

One aspect is to provide an electric heater capable of heating an object to be heated as evenly as possible while minimizing dielectric breakdown.

Another aspect is to provide an electric heater capable of minimizing local heating of a bridge connecting adjacent tracks.

Another aspect is to provide an electric heater which may secure a clearance between a track and a bridge by a simple structure.

An example of an electric heater includes a substrate; and a first plane heating element disposed on one surface of the substrate, in which the first plane heating element includes a first track; a second track spaced apart from the first track; and a third track spaced apart from the second track, at least a portion of the second track is located between the first track and the third track, the first track and the second track are connected by a first bridge, the first bridge includes a first outer protrusion protruding toward the third track, the third track is formed with a curved portion which protrudes in an outward direction, and the first outer protrusion faces an inside of the curved portion in the outward direction and is spaced apart from the curved portion.

The curved portion may be recessed to form a receiving groove for receiving a portion of the first outer protrusion.

A radius of curvature of the curved portion may be larger than a radius of curvature of the first bridge.

The second track and the third track may be connected by a second bridge. A first electrode portion spaced apart from the second bridge may be connected to the first track. The second bridge may include a second outer protrusion protruding in a different direction to the first electrode portion.

The electric heater may further include a second plane heating element disposed on the inside of the first plane heating element so as to be spaced apart from the first plane heating element. The second plane heating element may include a plurality of inner tracks which become smaller gradually as the distance from the first plane heating element increases. In addition, adjacent tracks of the plurality of inner tracks may be connected by an inner bridge.

The electric heater may further include a second electrode portion connected to an inner track of the plurality of inner tracks, which is located at the outermost side. The first electrode portion may be located between the second electrode portion and the second bridge.

The size of the first bridge may be larger than the size of the inner bridge.

The width of at least one of the first track, the second track, and the third track may be wider than the width of the inner track.

Another example of an electric heater includes a substrate; a first plane heating element disposed on one surface of the substrate and having a plurality of outer tracks and at least one outer bridge; and a second plane heating element disposed inside the first plane heating element and having a plurality of inner tracks and at least one inner bridge.

At least one outer bridge of the first plane heating elements may be formed with an inner protrusion protruding toward the first plane heating element.

The at least one outer bridge width may be narrower than the width of the outer track.

The at least one inner bridge width may be narrower than the width of the inner track.

It may be possible to make the gap between the third track and the first bridge and the gap between the third track and the second track as uniform as possible while maintaining the width of the first plane heating element as constant as possible. The first plane heating element may heat the object to be heated as evenly as possible, and an insulation breakdown between the third track and the first bridge may be minimized.

It may possible to minimize local heating of the first bridge, which may occur when the size of the first bridge is small.

The width of the outer bridge may be formed to be narrower than the width of the outer track, so that local heating of the outer bridge, which may occur when the length of the inner circumference of the outer bridge is too short, may be minimized.

The width of the inner bridge may be formed to be narrower than the width of the inner track, so that local heating of the inner bridge, which may occur when the length of the inner circumference of the inner bridge is too short, may be minimized.

DETAILED DESCRIPTION OF THE PREFERRED EMBODIMENTS

Hereinafter, preferred embodiments of the present invention will be described in detail with reference to the drawings.

Figure 1:
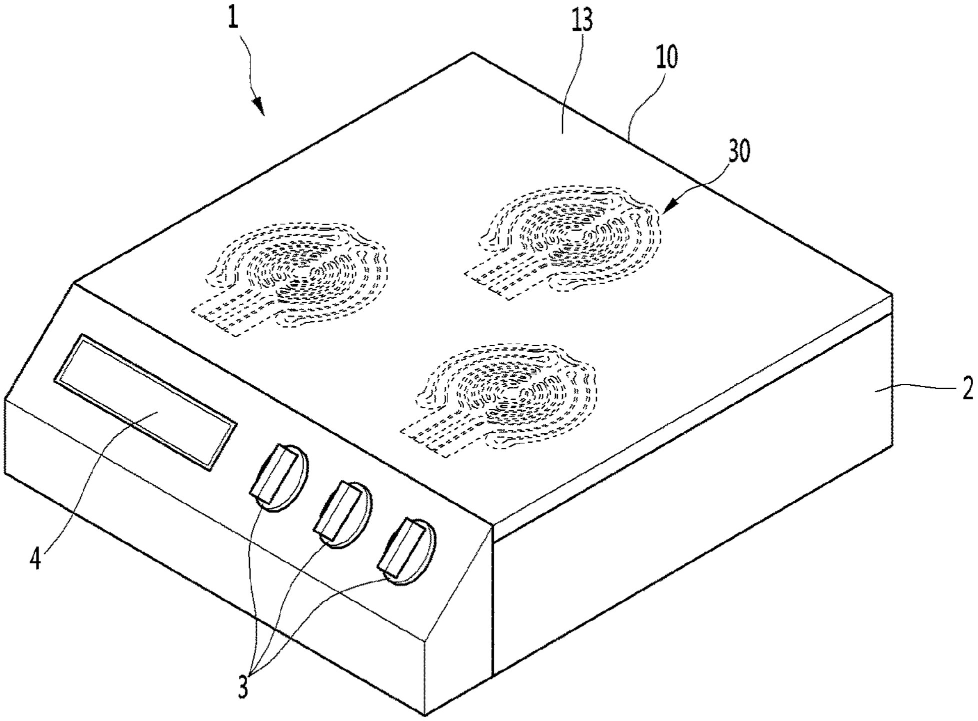
FIG. 1 is a perspective view illustrating an electric stove to which an electric heater is applied according to an embodiment of the present invention.
Figure 2:
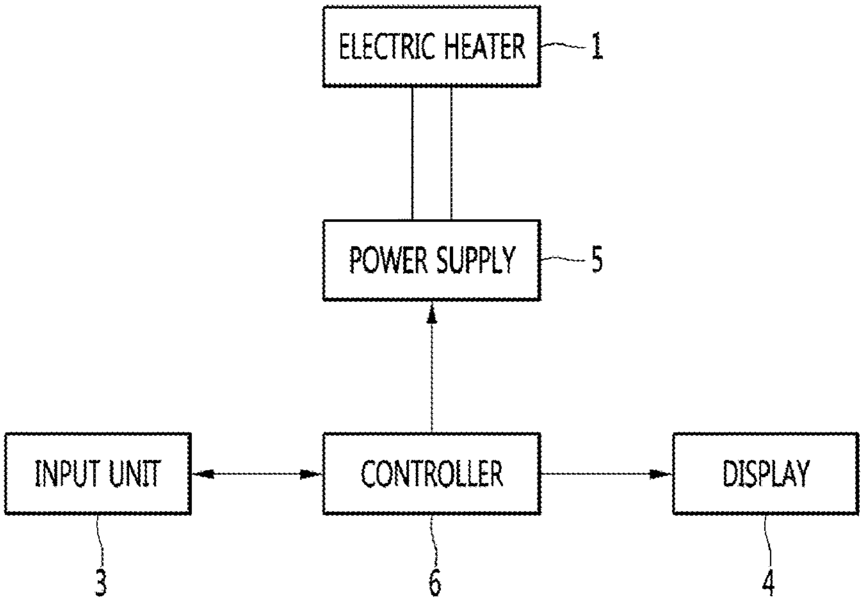
FIG. 2 is a control block diagram of an electric stove to which an electric heater according to an embodiment of the present invention is applied.

FIG. 1 is a perspective view illustrating an electric stove, to which an electric heater according to an embodiment of the present invention is applied, and FIG. 2 is a control block diagram of an electric stove, to which an electric heater according to an embodiment of the present invention is applied.

The electric heater 1 may configure a portion of an electric stove such as a cooktop.

The electric stove may include a case 2 forming an outer appearance. The electric heater 1 may be provided on the case 2. The upper surface of the case 2 may be opened and the electric heater 1 may be provided on the upper surface of the case 2.

The electric stove may include an input unit 3 for manipulating the electric stove and a display 4 for displaying a variety of information such as information on the electric stove. In addition, the electric stove may further include a power supply 5 connected to the electric heater 1 to apply current to the electric heater 1. The electric stove may further include a controller 6 for controlling the power supply 5, the electric heater 1, and the display 4 according to input of the input unit 3. An example of the controller 6 may be a microprocessor, a digital signal processor, an electronic logic circuit, and the like.

The electric heater 1 may be provided on the case 2 such that the upper surface thereof is exposed to the outside. An object to be heated by the electric stove may be placed on the upper surface of the electric heater 1, and the upper surface of the electric heater 1 may be a surface in which the object to be heated is seated.

Figure 3:
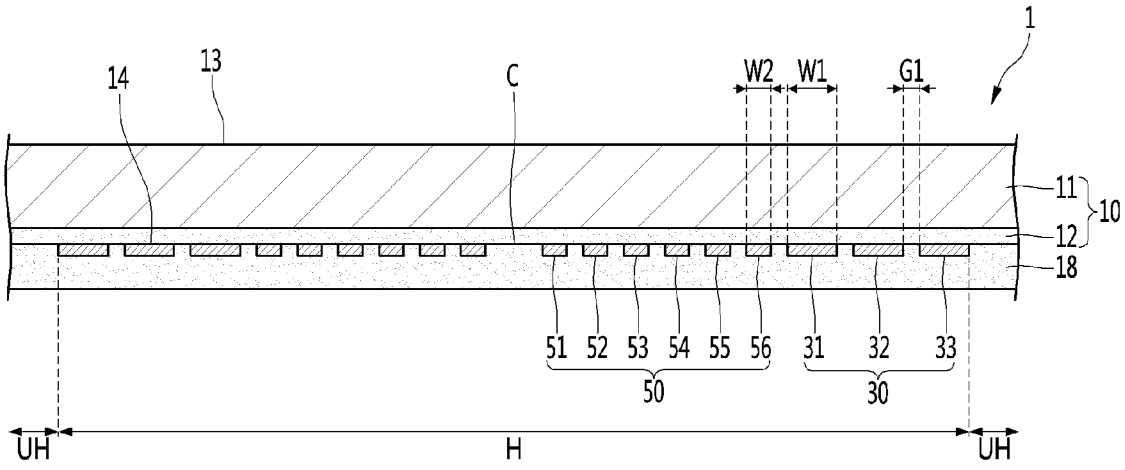
FIG. 3 is a cross-sectional view of an electric heater according to an embodiment of the present invention.

FIG. 3 is a cross-sectional view illustrating an electric heater according to an embodiment of the present invention.

The electric heater 1 may include a substrate 10 and a first plane heating element 30 disposed on one surface of the substrate 10.

The substrate 10 may be an insulating substrate having a conductor pattern disposed on a surface thereof. The upper surface of the substrate 10 may be a surface 13 in which the object to be heated is seated. The lower surface of the substrate 10 may include a plane heating element surface 14 on which the first plane heating element 30 and a second planed heating element to be described below are disposed.

The substrate 10 may include only a base 11 formed of an insulating material or may include a base 11 formed of an insulating material or a non-insulating material and an insulating layer 12 disposed on one surface of the base 11. Additional layers may be disposed on the substrate 10.

The base 11 may be glass and the insulating layer 12 may be disposed on the lower surface of the glass using a coating or a printing method, etc.

The first plane heating element 30 may be disposed directly on one surface of the base 11 made of an insulating material or may be disposed on the insulating layer 12 formed separately on one surface of the base 11.

The base 11 may be formed in a shape of a plate on which the object to be heated is placed or in a shape of a container in which the object to be heated is received.

The insulating layer 12 may be disposed on the lower surface of the base 11. The insulating layer 12 may be disposed on the entire lower surface of the base 11 or may be disposed on a portion of the lower surface of the base 11. The insulating layer 12 may be disposed only in a zone in which the first plane heating element 30 and the second plane heating element 50 to be described below will be disposed. The insulating layer 12 may configure the entire lower surface of the substrate 10 or a portion of the lower surface of the substrate 10.

The first plane heating element 30 may be disposed on the lower surface 14 of the insulating layer 12. The first plane heating element 30 and the second plane heating element 50 may have a size smaller than the substrate 10 and the lower surface of the substrate 10 may have a heated zone H, in which the first plane heating element 30 and the second plane heating element 50 are disposed, and an unheated zone UH located around the heated zone H.

The heater 1 may further include a coating layer 18 surrounding the first plane heating element 30 and the second plane heating element 50. The coating layer 18 may be formed of an electrically insulating material to protect the first plane heating element 30 and the second plane heating element 50.

The substrate 10 of the present embodiment may be formed of a flexible material, such as a flexible insulating film. In this case, the electric heater 1 may be a flexible planar heater. Such a flexible planar heater may be attached to a member, on which the object to be heated is placed, to heat the object to be heated, like the upper plate of the electric stove.

Figure 4:
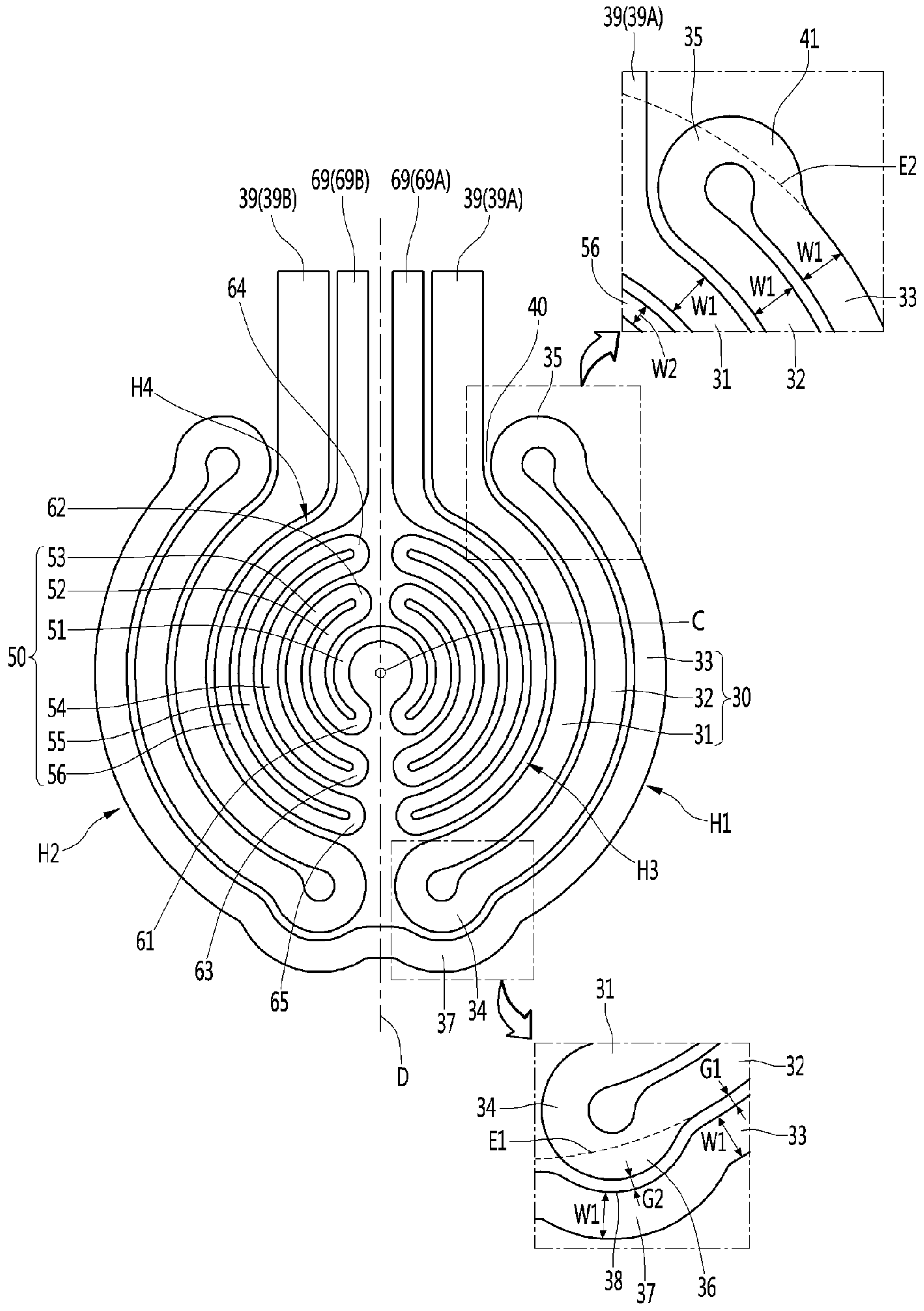
FIG. 4 is a plan view illustrating an electric heater according to an embodiment of the present invention.

FIG. 4 is a plan view illustrating an electric heater according to an embodiment of the present invention.

The first plane heating element 30 may be formed in a shape or a pattern capable of heating the object to be heated as uniformly as possible and, to this end, may include a plurality of tracks 31, 32, and 33 spaced apart from each other.

Each of the plurality of tracks 31, 32, and 33 may have an arc shape. The tracks 31, 32, and 33 may be formed in a major-arc shape having a central angle (angle of an arc) of more than 180 degrees, a semi-circular shape, or a minor-arc shape having a central angle (angle of an arc) of less than 180 degrees.

The plurality of tracks 31, 32, and 33 may be a combination of at least two tracks among a track having a major-arc shape, a track having a semicircular shape, and a track having a minor arc shape, may be a combination of tracks having minor-arc shapes, may be a combination of tracks having major-arc shapes, may be a combination of tracks having major-arc shapes and the tracks having minor-arc shapes, and may form a predetermined heating pattern by various combinations.

The plurality of tracks 31, 32, and 33 may be arc-shaped having the same center C, and the plurality of tracks 31, 32, and 33 may be connected in series in the direction of current flow. The first plane heating element 30 may include bridges 34 and 35 connecting adjacent tracks of the plurality of tracks 31, 32, and 33 in series.

For example, the first plane heating element 30 may include a first track 31, a second track 32 spaced apart from the first track 31, and a third track 33 spaced apart from the second track 32.

At least a portion of the second track 32 may be located between the first track 31 and the third track 33, and the first track 31 and the second track 32 may be connected to the first bridge 34, and the second track 32 and the third track 33 may be connected to the second bridge 35.

Each of the first track 31, the second track 32, and the third track 33 may have arc shapes. The first track 31, the second track 32, and the third track 33 may be formed to have the same center C.

The first track 31 may be a track closest to the center C of the plurality of tracks 31, 32 and 33 and the third track 33 may be a track farthest from the center C of the plurality of tracks 31, 32 and 33.

The current may flow in the order of the first track 31, the first bridge 34, the second track 32, the second bridge 35 and the third track 33.

It is preferable that a width W1 of the first plane heating element 30 is entirely the same.

The width W1 of the first track 31, the first bridge 34, the second track 32, the second bridge 35, and the third track 33 may be the same, respectively.

The second track 32 may be disposed on the outside of the first track 31 so as to surround the entire outer circumference or a portion of the first track 31.

The third track 33 may be disposed on the outside of the second track 32 so as to surround the entire outer circumference or a portion of the second track 32.

The first track 31, the second track 32, and the third track 33 may be sequentially disposed about the center C with respect to each other in the outward direction.

The first track 31 may be the track closest to the center C in the inward direction and the third track 33 may be the track farthest in the outward direction from the center C.

The inner direction described in this specification may be defined as a direction toward the center C of the first plane heating element 30 with respect to the track and the outward direction described in this specification may be defined as the direction opposite to the inward direction, that is, a direction outward from the center C of the first plane heating element 30 with respect to the track.

The first plane heating element 30 may have the same shape symmetrically with respect to the center line D across the first plane heating element 30. Here, the center line D is an imaginary line which intersects the third track 33 without intersecting the first track 31 and the second track 32 among the plurality of tracks 31, 32, and 33.

The first plane heating element 30 may include a pair of first tracks 31, a pair of first bridges 34, a pair of second tracks 32, a pair of second bridges 35, and a third track 33.

The first plane heating element 30 includes a pair of first tracks 31 having a minor-arc shape, a pair of second tracks 32 having a minor-arc shape, and a third track 33 having a major-arc shape.

The first plane heating element 30 may include two outer heating units H1 and H2 based on the center line D and may be divided into a first outer heating unit H1 and a second outer heating unit H2.

The width W1 of at least one of the first track 31, the second track 32, and the third track 33 may be wider than a width W2 of the inner tracks 51, 52, 53, 54, 55, and 56.

The size of the first bridge 34 may be larger than the size of the inner bridges 61, 62, 63, 64, and 65 to be described below.

The first bridge 34 may include a first outer protrusion 36 protruding toward the third track 33.

The first outer protrusion 36 of the first bridge 34 may be defined as a portion located outside an extension curve E1 with respect to the extension curve E1 extending from the second track 32, and the extension curve E1 may be an imaginary curve extending in the extending direction of the second track 32 in the outer circumference of the second track 32.

The first bridge 34 may be formed in a semicircular shape or a major-arc shape as a whole. In a case where the path difference (the difference between the length of the outer circumference and the length of the inner circumference) between the inner circumference and the outer circumference thereof is respectively large, local heating may occur due to the resistance difference, and in a case where the length of the inner circumference and the length of the outer circumference are respectively increased, the path difference between the inner circumference and the outer circumference may be relatively reduced.

As described above, in a case where the first bridge 34 is formed to have a relatively large size, the first bridge 34 may include a portion which is located on the outside of the extension curve E1 with respect to the extension curve E1 extending from the second track 32 and this portion may be defined as a first outer protrusion 36.

A curved portion 37 may be formed on the third track 33 so as to protrude in the outward direction. The first outer protrusion 36 that protrudes toward the curved portion 37 may be accommodated at a space at the inner side of the curved portion 37, and may be spaced apart from the curved portion 37 (see FIG. 4).

The curved portion 37 is a portion in which a portion of the third track 33 convexly protrudes in the outward direction and the width W1 thereof may be the same as the width W1 around the curved portion 37.

The curved portion 37 may be recessed into a receiving groove 38 in which a portion of the first outer protrusion 36 of the first bridge 34 is received.

A gap G1 between the third track 33 and the second track 32 may be equal to a gap G2 between the first outer protrusion 36 and the curved portion 37 of the first bridge 34. The curved portion 37 may be an avoidance portion for avoiding contact with the first outer protrusion 36 of the first bridge 34.

Each of the first bridge 34 and the curved portion 37 may has an arc shape, the first bridge 34 may have a major-arc shape, and the curved portion 37 may have a minor-arc shape.

The curvature radius of the curved portion 37 may be larger than the radius of curvature of the first bridge 34.

A first electrode portion 39 may be connected to either the first track 31 or the third track 33 of the first plane heating element 30.

In a case where the first plane heating element 30 includes a pair of the first tracks 31 and a third tracks 33, in this embodiment, a positive electrode portion 39A connects to one of the pair of first tracks 31 and a negative electrode portion 39B connects to another one of the pair of first tracks 31.

In a case where the first electrode portion 39 includes the positive electrode portions 39A and the negative electrode portions 39B connected to the pair of first tracks 31, and in a case where an opening portion 40 is formed between the second bridges 35, at least a portion of each of the positive electrode portion 39A and the negative electrode portion 39B may be located at the opening portion 40. Each of the positive electrode portions 39A and the negative electrode portions 39B may have a shape which extends outward between the pair of second bridges 35 through the opening portion 40

The first electrode portion 39 may be spaced apart from the second bridge 35.

The second bridge 35 may be located around the first electrode portion 39. The second bridge 35 may be located outside the first electrode portion 39.

The size of the second bridge 35 may be larger than the size of the inner bridges 61, 62, 63, 64, and 65 to be described below.

The second bridge 35 may include a second outer protrusion 41 protruding in a direction opposite to the first electrode portion 39.

The second bridge 35 may be the same size as the first bridge 34 and may be located on the opposite side of the first bridge 34 with respect to the second pattern portion 32. In other words, one end portion of the second pattern portion 32 may be connected to the first bridge 34, and the other end of the second pattern portion 32 may be connected to the second bridge 35.

Like the first bridge 34, the second bridge 35 may be formed in a semicircular shape or a major-arc shape as a whole. In a case where a path difference between the outer circumference and the inner circumference (the length of the outer circumference and a length of the circumference) is large, local heating may be generated due to the resistance difference, and in a case where the length of the inner circumference and the length of the outer circumference are respectively increased, the path difference between the inner circumference and the outer circumference may be relatively reduced.

The second outer protrusion 41 of the second bridge 35 may be defined as a portion located outside the extension curve E2 with respect to the extension curve E2 extending from the third track 33, and the curve E2 may be an imaginary curve extending in the extension direction of the third track 33 in the outer circumference of the third track 33.

As described above, in a case where the size of the second bridge 35 is increased, the second bridge 35 may include a portion which is located outside the extension curve E2 with respect to the extension curve E2 extending from the third track 33 and this portion may be defined as a second outer protrusion 41.

A pair of first tracks 31, a pair of first bridges 34, a pair of second tracks 32, a pair of second bridges 35, one third track 33, the positive electrode portion 39A, and the negative electrode portion 39B may be integrally formed and the positive electrode portions 39A and the negative electrode portions 39B may be formed to be larger in size and to be thicker than the pair of first tracks 31, the pair of first bridges 34, and the pair of second track 32, the pair of second bridge 35, and one third track 33.

The electric heater 1 may further include a second plane heating element 50.

The second plane heating element 50 may be spaced apart from the first plane heating element 30 and may generate heat separately from the first plane heating element 30. The second plane heating element 50 may be disposed on the inside of the first plane heating element 30 so as to be spaced apart from the first plane heating element 30 and may be radially spaced from the first plane heating element 30.

The electric heater 1 may be controlled (by the controller 6) in a single heating mode in which current is applied to only one of the first plane heating element 30 and the second plane heating element 50 or a dual heating mode in which current is applied to both the first plane heating element 30 and the second plane heating element 50.

For example, in a case where the size of the object to be heated is small, that is, in a case where the area of the portion of the object to be heated which is seated on the substrate 1 is small, current is applied only to the second plane heating element 50 of the electric heater 1 and current may not be applied to the first plane heating element 30. On the other hand, when the object to be heated is large, that is, the area of the portion of the object to be heated which is seated on the substrate 1 is large, current may be applied to the first plane heating element 30 and the second plane heating element 50, respectively.

The second plane heating element 50 may be located between the center C on which the first plane heating element 30 is centered and the first plane heating element 30 and may be spaced apart from the center C and the first plane heating element 30, respectively.

The second plane heating element 50 may include a plurality of inner tracks 51, 52, 53, 54, 55, and 56 which gradually decrease in size as being further away from the first plane heating element 30. The plurality of inner tracks 51, 52, 53, 54, 55, and 56 may have arc shapes and may be formed about the same center C. The plurality of inner tracks 51, 52, 53, 54, 55, and 56 may be spaced apart from each other in the radial direction, and may become gradually larger from the innermost side toward the outermost side of the second plane heating element 50.

The second plane heating element 50 may include an inner bridge connecting the adjacent inner tracks among the plurality of inner tracks 51, 52, 53, 54, 55, and 56. The second plane heating element 50 may include a plurality of inner bridges 61, 62, 63, 64, and 65.

It is preferable that a width W2 of the second plane heating element 50 is generally the same. The width of each of the plurality of inner tracks 51, 52, 53, 54, 55, and 56 and all the width of each of the plurality of inner bridges 61, 62, 63, 64, and 65 may the same.

On the other hand, in a case where the electric heater 1 includes both the first heating element 30 and the second plane heating element 50, the first plane heating element 30 is an outer heating element located outside the second plan heating element 50 relatively, and the second plane heating element 50 may be an inner heat emission element.

As described above, in a case where the electric heater 1 includes both the outer heating element and the inner heating element, the heat of the inner heating element heats the object to be heated as much as possible, while a portion of the heat of the outer heating element is not used to heat the object to be heated and may be discharged to the outside.

In a case where this is considered, it is preferable that the width W1 of the second plane heating element 50 is formed to be larger than the width W2 of the first plane heating element 30.

The electric heater 1 may include a second electrode portion 69 connected to a track 56 located on the outermost side of a plurality of inner tracks 51, 52, 53, 54, 55, and 56.

The plurality of inner tracks 51, 52, 53, 54, 55, and 56 may be configured such that the two inner heating units H3 and H4 are symmetrical with respect to the center line D.

The inner tracks of the plurality of inner tacks 51, 52, 53, 54, 55, and 56 which are located at the innermost side, that is, the inner track of the plurality of inner tacks 51, 52, 53, 54, 55, and 56 which are closest to the center C may have a shape connecting the two inner heating units H3 and H4 having such a symmetrical structure.

The inner tracks 51 of the plurality of inner tracks 51, 52, 53, 54, 55, and 56 which are closest to the center C may have a major-arc shape and other inner tracks 52, 53, 54, 55, and 56 in addition to the inner tracks 51 may have a minor-arc shape.

The second plane heating element 50 may be divided into a first inner heating portion H3 and a second inner heating portion H4 with respect to a center line D.

The second electrode portion 69 may include a positive electrode portion 69A connected to the track 56 of the first inner heating unit H3 which is located at the outermost side and a negative electrode portion 69B of the second inner heating unit H4 which is located at the outermost side.

In a case where the electric heater 1 includes both the first electrode portion 39 and the second electrode portion 69, the first electrode portion 39 may be disposed between the second electrode portion 69 and the second bridge 35. The first electrode portion 39 may be spaced horizontally from the second electrode portion 69 and the second bridge 35, respectively.

As described above, in a case where the electric heater 1 includes both the first plane heating element 30 and the second plane heating element 50, the plurality of tracks 31, 32, and 33 of the first plane heating element 30, may be the plurality of outer tracks 31, 32, and 33 disposed on one surface of the insulating layer 10.

The first bridge 34 and the second bridge 35 connecting the adjacent outer tracks among the plurality of outer tracks 31, 32, and 33 may be outer bridges. The size of the outer bridges 34 and 35 may be larger than the size of the inner bridges 61, 62, 63, 64, and 65.

The third track 33, which is a track located at the outermost side among the first track 31, the second track 32 and the third track 33, may be the outermost track. The outermost track may be formed with a curved portion 37 which is bent so as to protrude outwardly as described above. The outer bridge 34 facing the curved portion 37 may be formed with an outer protrusion 36 protruding toward the space at the inner side of the curved portion 37 and spaced apart from the curved portion 37.

A plurality of inner tracks 51, 52, 53, 54, 55, and 56, a plurality of inner bridges 61, 62, 63, 64, and 65, the positive electrode portion 69A, and the negative electrode portion 69B may be integrally formed, and the positive electrode portions 69A and the negative electrode 69B may be formed to be larger in width or in thickness than that of a plurality of inner tracks 51, 52, 53, 54, 55, and 56, and a plurality of inner bridges 61, 62, 63, 64, and 65.

Figure 5:
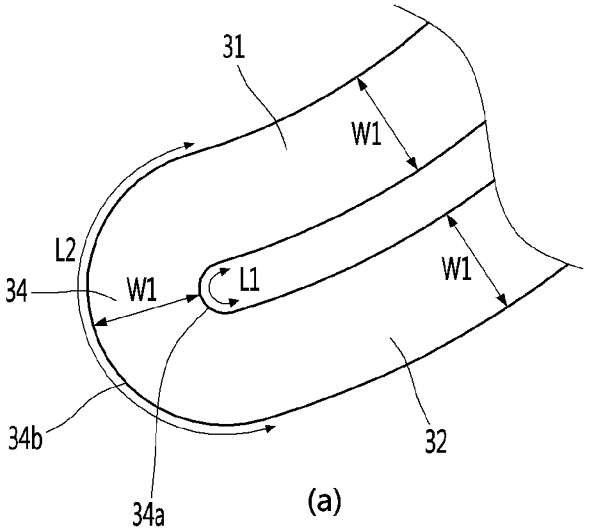
FIGS. 5(*a*) and 5(*b*) are views comparing an outer bridge of an embodiment of the present invention with a bridge of a comparative example.
Figure 5:
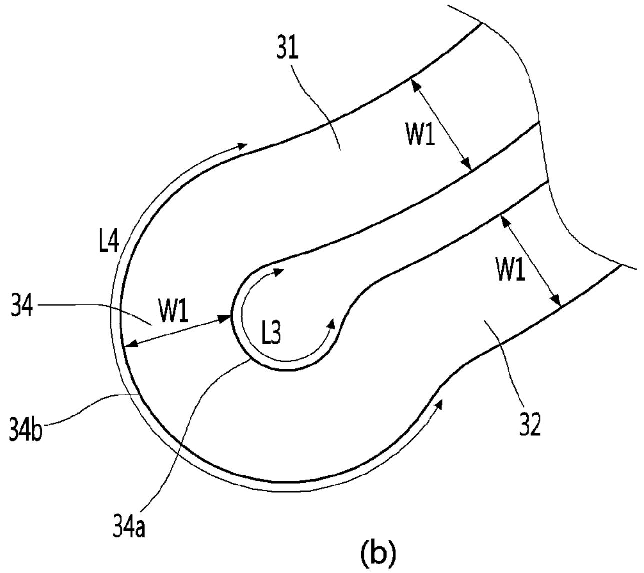

FIGS. 5(*a*) and 5(*b*) are views comparing an outer bridge of an embodiment of the present invention with a bridge of a comparative example.

FIG. 5 (*a*) is a view illustrating a bridge having a smaller size than the outer bridge 34 of the embodiment of the present invention, the inner circumference 34*a* of the bridge 34 illustrated in FIG. 5 (*a*) may connect the outer circumference of the first track 31 and the inner circumference of the second track 32 to each other, have a semicircular or minor-arc shape, and may have a first length L1. The outer circumference 34*b* of the bridge 34 illustrated in FIG. 5 (*a*) may connect the inner circumference of the first track 31 and the outer circumference of the second track 32 to each other, have a semicircular or minor-arc shape, and have a second length L2.

FIG. 5 (*b*) is a view illustrating an outer bridge in an embodiment of the present invention, and each of the inner circumference 34*a* and the outer circumference 34*b* of the outer bridge 34 may have a major-arc shape, respectively.

The width W1 of the outer bridge 34 illustrated in FIG. 5 (*b*) may be the same as the width W1 of the bridge 34 illustrated in FIG. 5 (*a*).

The inner circumference 34*a* of the outer bridge 34 illustrated in FIG. 5 (*b*) may connect the outer circumference of the first track 31 and the inner circumference of the second track 32 to each other, has a major-arc shape, and have a third length L3 longer than the first length L1 of the comparative example.

The outer circumference 34B of the outer bridge 34 illustrated in FIG. 5 (*b*) may connect the inner circumference of the first track 31 and the outer circumference of the second track 32, have a major-arc shape, and may have a fourth length L4 which is longer than the second length L2 of the comparative example.

In a case of the comparative example illustrated in FIG. 5(*a*), since the length of the inner circumference 34*a* of the bridge 34 is relatively short, the current density on a side of the inner circumference 34*a* is excessively high as compared with the current density on the outer circumference 34*b* side, and in the comparative example, local heating may occur due to excessive current density difference.

On the other hand, in the bridge 34 of the present embodiment as illustrated in FIG. 5(*b*), the length of the inner circumference 34*a* is longer than that of the comparative example, the current density on a side of the inner circumference 34*a* is relatively smaller than that of the comparative example, thus localized heat that may be generated when the current density of the inner circumference 34*a* is excessively high may be minimized.

Figure 6:
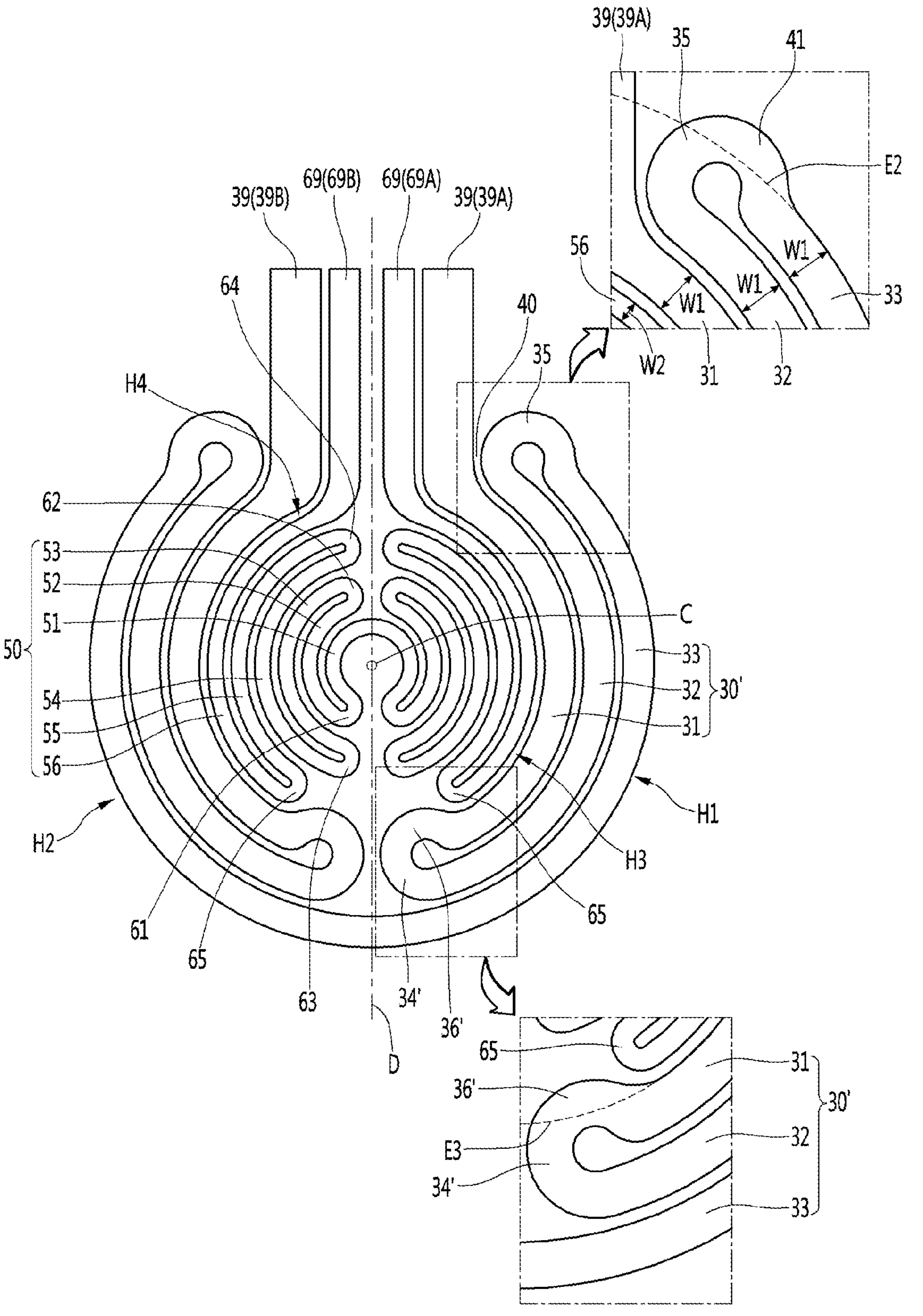
FIG. 6 is a plan view illustrating an electric heater according to another embodiment of the present invention.

FIG. 6 is a plan view illustrating an electric heater according to another embodiment of the present invention.

This embodiment includes a first plane heating element 30' and a second plane heating element 50. The first plane heating element 30' includes a plurality of outer tracks 31, 32 and 33 and a plurality of outer bridges 34' and 35, wherein at least one outer bridge 34' and 35 may be different from the embodiment illustrated in FIG. 4.

At least one outer bridge 34' of the first plane heating elements 30' may be close to the second plane heating elements 50, and thus the outer bridge 34' close to the second plane heating element 50 may formed with an inner protrusion 36' protruding toward the second plane heating element 50.

In the present embodiment, the outer bridge 34' is formed to have a large size on the same principle as the first bridge 34 of the embodiment illustrated in FIG. 4, and is an example in which the protrusion direction of the protrusion of the outer bridge 34' is transformed to a direction in which the second heating element 50 is located in order to be large in size.

The inner protrusion 36' may be defined as a portion located outside the extension curve E3 with respect to the extension curve E3 extending from the first track 31 and the extension curve E3 may be an imaginary curve extended in the extension direction of the first track 31 in the inner circumference.

In this case, the curved portion 37 as in the embodiment illustrated in FIG. 4 may not necessarily be required in the first plane heating element 30, and the entirety of the third track 33 of the first plane heating element 30 may have a smooth arc shape.

Meanwhile, the second plane heating element 50 may be formed in a pattern which does not interfere with the inner protrusion 34' as described above, and the inner bridge 65 of the plurality of inner bridges 61, 62, 63, 64, and 65 which is located at the outermost side may face the inner protrusion 36' in the horizontal direction.

It is also be possible to include both the first outer protrusion 36 of the embodiment illustrated in FIG. 4 and the inner protrusion 36' of the present embodiment. At least one track 33 of the outer tracks 31, 32 and 33 may be formed with a curved portion 37 spaced apart from the first outer protrusion 36 as in the embodiment illustrated in FIG. 4. Of course, the inner bridge 65 of the plurality of inner bridges 61, 62, 63, 64, and 65 of the second plane heating elements 30 which is located at the outermost side may face the inner protrusion 36' along an arc curvature of the inner track on which the inner bridge 65 is formed, as in the embodiment illustrated in FIG. 6.

Figure 7:
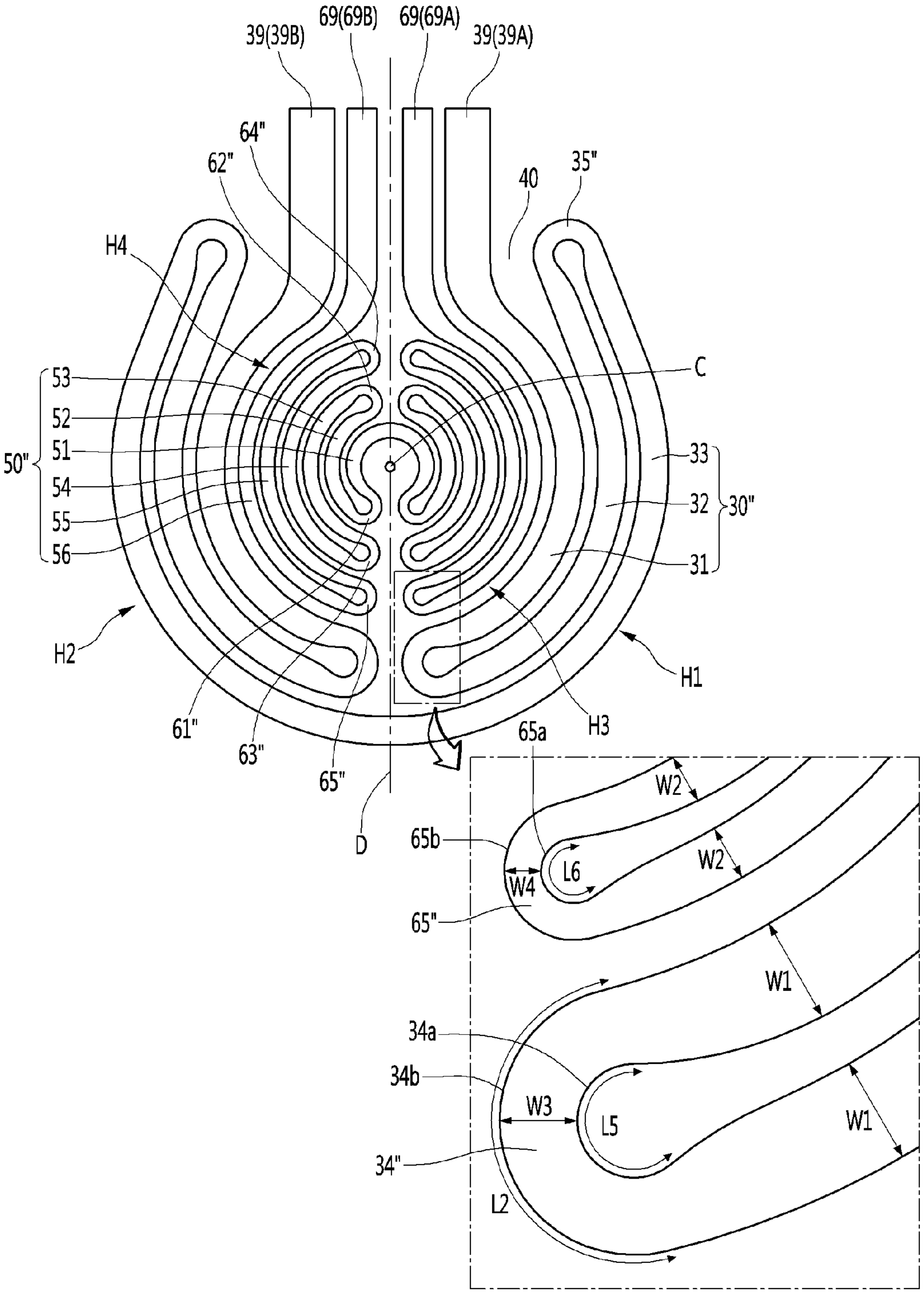
FIG. 7 is a plan view illustrating an electric heater according to another embodiment of the present invention.

FIG. 7 is a plan view illustrating an electric heater according to another embodiment of the present invention.

This embodiment includes a first plane heating element 30" and a second plane heating element 50", and the first plane heating element 30" includes the outer tracks 31, 32, and 33 and the outer bridge 34" and 35"; wherein at least one outer bridge 34" and 35" may be different from the embodiment illustrated in FIG. 4 or the embodiment illustrated in FIG. 6.

The width W3 of at least one outer bridges 34" and 35" may be narrower than the width W1 of the outer tracks 31, 32, and 33.

The outer bridges 34" and 35" include an inner circumference 34*a* and an outer circumference 34*b*, wherein the length L5 of the inner circumference 34*a* thereof may be formed to be longer than the length L1 of the inner circumference of the bridge 34 of the comparative example illustrated in FIG. 5 (*a*).

In the comparative embodiment illustrated in FIG. 5(*a*), the arc length L1 of the inner circumference 34*a* of the bridge 34 is relatively short and the current density on a side of the inner circumference 34*a* of the bridge 34 may be too high, and thus the local heating of the bridge 34 may be increased.

On the other hand, in the present embodiment, since the width W3 of the outer bridges 34" and 35" is narrower than that of the inner tracks 31, 32 and 33, the arc length L5 of the inner circumference 34*a* may be formed to be longer than the arc length L1 of the comparative example and the inner circumferential current density of the outer bridges 34" and 35" may be lower than that of the comparative example and local heating of the outer bridges 34" and 35" may be minimized.

The second plane heating element 50" of the present embodiment includes the inner tracks 51, 52, 53, 54, and 55 and the inner bridges 61", 62", 63", 64", and 65"; wherein at least one inner bridge 61", 62", 63", 64", 65" may be different from the bridges 61, 62, 63, 64, 65 of the embodiment illustrated in FIG. 4 or the embodiment illustrated in FIG. 6.

The width W4 of at least one inner bridge 61", 62", 63", 64", and 65" may be formed to be narrower than the width W2 of the inner tracks 51, 52, 53, 54, and 55.

The inner bridges 61", 62", 63", 64", and 65" may include an inner circumference 65*a* and an outer circumference 65*b* and the length L6 of the inner circumference 65*a* may be formed to be long on the same principle as in a case of the outer bridge, and the local heating of the inner bridges 61", 62", 63", 64", and 65" may be minimized.

In this embodiment, the other configurations other than the width W3 of the outer bridges 34" and 35" and the width W4 of the inner bridges 61", 62", 63", 64", and 65" may be the same as or similar to those of the embodiments illustrated in FIG. 4 and FIG. 6, and a detailed description thereof will be omitted.

The foregoing description is merely illustrative of the technical idea of the present invention and various changes and modifications may be made by those skilled in the art without departing from the essential characteristics of the present invention.

Therefore, the embodiments disclosed in the present disclosure are intended to illustrate rather than limit the technical idea of the present invention, and the scope of the technical idea of the present invention is not limited by these embodiments.

The scope of protection of the present invention should be construed according to the following claims, and all technical ideas falling within the equivalent scope to the scope of protection should be construed as falling within the scope of the present invention.

What is claimed is:

1. An electric heater, comprising:

a substrate;

a first plane heating element disposed on one surface of the substrate, the first plane heating element including:

a first electrode portion;

a first track extending from the first electrode portion;

a second track outwardly spaced apart from the first track;

a third track outwardly spaced apart from the second track, wherein at least a portion of the second track is located between the first track and the third track;

a first bridge configured to connect one end of the first track and one end of the second track; and an inner protrusion protruding towards a center of the first plane beating element; and a second plane heating element disposed on an inner side of the first plane heating element and inwardly spaced apart from the first plane heating element, the second plane heating element including:

a plurality of inner tracks which become smaller in length as a distance between an inner track and the first plane heating element increases;

a second electrode portion connected to an inner track of the plurality of inner tracks, which is located at an outermost side of the second plane heating element; and a plurality of inner bridges to connect ends of adjacent inner tracks among the plurality of inner tracks, wherein a width of each track of the first plane heating element or a width of each track of the second plane heating element is configured to be larger than a gap of adjacent tracks, wherein the first electrode portion is located between the second electrode portion and the second bridge.

2. The electric heater of claim 1, wherein the inner protrusion is defined as a portion located outside an imaginary extension curve that extends from an inner circumference of the first track along an arc curvature of the first track.

3. The electric heater of claim 2, wherein a width of the first tack is identical to a width of the inner protrusion.

4. The electric heater of claim 2, further comprising a second bridge configured to connect the other end of the second track and an end of the third track.

5. The electric heater of claim 4, wherein the first electrode portion is spaced apart from the second bridge and connected to the other end of the first track.

6. The electric heater of claim 4, wherein the first bridge includes an outer protrusion protruding in a direction getting away from the center of the first plane heating element.

7. The electric heater of claim 6, wherein the outer protrusion is a portion protruding outside an extension curve extending from an outer circumference the third track along an arc curvature of the third track.

8. The electric heater of claim 4, wherein a size of the second bridge is identical to a size of the first bridge.

9. The electric heater of claim 1, wherein a size of the first bridge is larger than a size of the inner bridge.

10. The electric heater of claim 1, wherein a width of at least one of the first track, the second track, and the third track is wider than a width of the inner track.

11. The electric heater of claim 1, wherein each of the first and second track has a minor-arc shape, which has an arc angle of less than 180°, and wherein the third track has a major-arc shape, which has an arc angle of more than 180°.

12. A cooking appliance comprising:

a case forming an outer appearance;

a display;

an input unit;

a power supply;

the electric heater of claim 1, wherein the electric heater is provided on the case; and a controller for controlling the electric heater, the power supply, and the display according to an input from the input unit.

* * * * *